(12) United States Patent
Smithyman et al.

(10) Patent No.: US 11,961,972 B1
(45) Date of Patent: Apr. 16, 2024

(54) FLEXIBLE MULTI-BATTERY ASSEMBLIES, FLEXIBLE ELECTROCHEMICAL CELLS FORMING SUCH ASSEMBLIES, AND METHODS OF FABRICATING THEREOF

(71) Applicant: CCL LABEL, INC., Framingham, MA (US)

(72) Inventors: Jesse Smithyman, Oakland, CA (US); Konstantin Tikhonov, Pleasanton, CA (US); Christine Ho, Fremont, CA (US); Chaojun Shi, Fremont, CA (US)

(73) Assignee: CCL LABEL, INC., Framingham, MA (US)

( * ) Notice: Subject to any disclaimer, the term of this patent is extended or adjusted under 35 U.S.C. 154(b) by 306 days.

(21) Appl. No.: 16/911,789

(22) Filed: Jun. 25, 2020

Related U.S. Application Data

(60) Provisional application No. 62/866,077, filed on Jun. 25, 2019.

(51) Int. Cl.
| | |
|---|---|
| *H01M 10/0585* | (2010.01) |
| *H01M 4/04* | (2006.01) |
| *H01M 4/139* | (2010.01) |
| *H01M 4/66* | (2006.01) |
| *H01M 10/04* | (2006.01) |

(52) U.S. Cl.
CPC ..... *H01M 10/0585* (2013.01); *H01M 4/0404* (2013.01); *H01M 4/139* (2013.01); *H01M 4/661* (2013.01); *H01M 10/0436* (2013.01)

(58) Field of Classification Search
CPC .......... H01M 10/0436; H01M 4/0404; H01M 4/0407; H01M 6/40; H01M 10/0585; Y02E 60/10; Y02P 70/50; Y02T 10/70
See application file for complete search history.

(56) References Cited

U.S. PATENT DOCUMENTS

| | | | |
|---|---|---|---|
| 9,076,589 B2 | 7/2015 | Wright et al. | |
| 9,276,292 B1 | 3/2016 | Mackenzie et al. | |
| 2004/0009334 A1* | 1/2004 | Miyamoto | H01M 50/569 428/209 |
| 2004/0185334 A1* | 9/2004 | Iwamoto | H01M 10/0436 429/127 |
| 2005/0175902 A1* | 8/2005 | Parsian | H01M 10/0413 429/233 |

(Continued)

*Primary Examiner* — Cynthia K Walls
(74) *Attorney, Agent, or Firm* — McDonald Hopkins LLC

(57) ABSTRACT

Provided are flexible multi-battery assemblies and methods of manufacturing these assemblies. In some examples, a flexible multi-battery assembly comprises a first current collector, parsed into a first plurality of current collector portions such that each portion contacts one of a plurality of electrochemically active stacks. The second current collector may be continuous (e.g., to provide support to the electrochemically active stacks) or similarly parsed into a second plurality of current collector portions. Each electrochemically active stack forms one of flexible electrochemical cells in the flexible multi-battery assembly. Furthermore, at least one outer surface of the first current collector or the second outer surface is fully exposed, e.g., to allow forming electrical and mechanical connections directly to one or both current collectors. In some examples, an insulator layer covers a non-exposed surface of the other current collector.

20 Claims, 9 Drawing Sheets

(56) References Cited

U.S. PATENT DOCUMENTS

| | | | | |
|---|---|---|---|---|
| 2005/0260492 A1* | 11/2005 | Tucholski | ............ | H01M 6/5011 |
| | | | | 429/185 |
| 2006/0216586 A1* | 9/2006 | Tucholski | ............. | H01M 4/663 |
| | | | | 429/185 |
| 2010/0266895 A1* | 10/2010 | Tucholski | ............... | H01M 6/12 |
| | | | | 429/185 |
| 2012/0118741 A1* | 5/2012 | Tucholski | ............. | H01M 4/244 |
| | | | | 204/630 |
| 2013/0029205 A1* | 1/2013 | Adams | ................ | H01M 50/183 |
| | | | | 429/185 |
| 2016/0056508 A1* | 2/2016 | Flitsch | .............. | H01M 10/0569 |
| | | | | 429/301 |
| 2016/0344062 A1* | 11/2016 | Wright | ................. | H01G 9/0029 |
| 2017/0288280 A1 | 10/2017 | Shi et al. | | |
| 2020/0044222 A1* | 2/2020 | Xiao | ................... | H01M 50/247 |

\* cited by examiner

FLEXIBLE MULTI-BATTERY ASSEMBLIES, FLEXIBLE ELECTROCHEMICAL CELLS FORMING SUCH ASSEMBLIES, AND METHODS OF FABRICATING THEREOF

CROSS-REFERENCE TO RELATED APPLICATIONS

This application claims the benefit under 35 U.S.C. § 119(e) of U.S. Provisional Patent Application 62/866,077, entitled: "MULTI-BATTERY ASSEMBLIES AND METHODS OF FABRICATING THEREOF", filed on 2019 Jun. 25, which is incorporated herein by reference in its entirety for all purposes.

BACKGROUND

Manufacturing of individual electrochemical cells is a complex process. This process typically starts with independent manufacturing of positive electrodes and negative electrodes. These electrodes are then arranged together with separators into stacked or wound assemblies. These assemblies are then filled with electrolyte and finally sealed (e.g., into pouches or cases) to isolate these assemblies from the environment. All of these individual processes and components add to the total cost of electrochemical cells and create potential failure points. At the same time, the demand and application diversity of electrochemical cells continue to increase, requiring less expensive and more robust cells with various different designs and features.

What is needed are new methods of manufacturing electrochemical cells as parts of integrated multi-battery assemblies.

SUMMARY

Provided are flexible multi-battery assemblies and methods of manufacturing these assemblies. In some examples, a flexible multi-battery assembly comprises a first current collector, parsed into a first plurality of current collector portions such that each portion contacts one of a plurality of electrochemically active stacks. The second current collector may be continuous (e.g., to provide support to the electrochemically active stacks) or similarly parsed into a second plurality of current collector portions. Each electrochemically active stack forms one of flexible electrochemical cells in the flexible multi-battery assembly. Furthermore, at least one outer surface of the first current collector or the second outer surface is fully exposed, e.g., to allow forming electrical and mechanical connections directly to one or both current collectors. In some examples, an insulator layer covers a non-exposed surface of the other current collector. The manufacturing of the flexible multi-battery assembly involves forming the electrochemically active stacks, each including a positive active material layer, an electrolyte layer, and a negative active material layer.

DETAILED DESCRIPTION

Figure 1A:
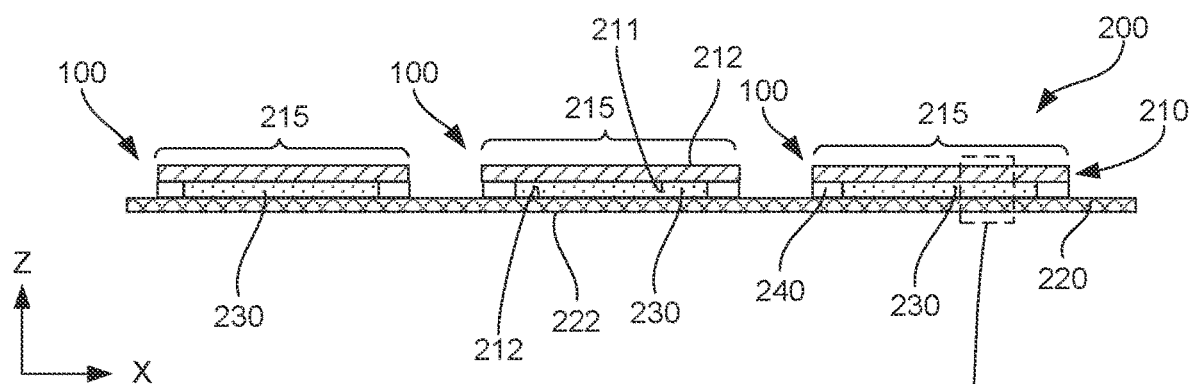
FIG. 1A is a schematic cross-sectional view of a flexible multi-battery assembly, in accordance with some examples.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting. On the contrary, it is intended to cover alternatives, modifications, and equivalents as may be included within the spirit and scope of the present disclosure as defined by the appended claims.

Various examples are described herein in the context of printable electrochemical cells, which are also flexible, with multi-valent metal ions (e.g., $Zn^{2+}$) carrying the charge between the positive and negative electrodes. "Multivalent" is defined, for purposes of this disclosure, as an atomic or molecular species carrying more than one full charge. However, one having ordinary skill in the art will appreciate that some features are applicable to other types of electrochemical cells and/or other methods of manufacturing electrochemical cells. For example, electrochemical cells with monovalent metal ions carrying the charge may be similarly integrated into electronic circuits.

In this disclosure, the term "anode" refers to a negative electrode, which includes one or more negative active materials. The term "cathode" refers to a positive electrode, which includes one or more positive active materials. Various examples of negative active materials and positive active materials are described below.

"Ionic liquids" or, more specifically, "room temperature ionic liquids" are defined as a class of liquids that are organic salts and that have low melting points (e.g., below 100° C.). Ionic liquids have high ionic conductivities and low vapor pressures. Furthermore, ionic liquids tend to be electrochemically and thermally stable. Combining ionic liquids with certain polymers may be used to form electrolytes that have ion transport characteristics similar to conventional liquid electrolytes (e.g., solvent-based electrolytes) and much better ion transport characteristics than in conventional polymer electrolytes or solid-state electrolytes. Furthermore, in some examples, electrolytes formed using ionic liquids are structurally robust and able to maintain physical separation between positive and negative electrodes under compression and bending conditions, thereby eliminating the need for porous separators. Finally, in a typical ambient environment and at a room temperature, electrolytes formed using ionic liquids do not dry out or "sweat" since the ionic liquids are negligibly volatile.

INTRODUCTION

Provided flexible multi-battery assemblies and methods of manufacturing these assemblies result in fewer components (e.g., layers) in comparison to conventional batteries, resulting in smaller (e.g., thinner) and cheaper batteries. Furthermore, manufacturing electrochemically active stacks in their entirety, including electrolyte layers, reduce the number of processing steps while improving battery performance. Furthermore, various manufacturing techniques, such as printing positive active material layers, electrolyte layers, and/or negative active material layers allow combining multiple battery designs (e.g., footprints) into the same manufacturing process.

It should be noted that selections of materials for current collectors depends on the composition of the electrochemically active stacks. For example, most metals corrode when used as positive current collectors and places in contact with zinc-carbon chemistry (e.g., $NH_4Cl$, $ZnCl_2$ or combination of the two as electrolyte salts). Conventional batteries utilize graphite rods, which are inert and allow for gas diffusion out of a battery. However, the form-function of these conventional batteries is limited.

Flexible multi-battery assemblies allow forming thin flexible electrochemical cells, which utilize one or more of the following materials for positive current collectors: (1) graphitic foils (SGL Group, NeoGraf have 25-150 um graphite foil), (2) protected metal current collectors, such as carbon-coated aluminum, steel, possibly copper, nickel. Carbon can be deposited from the slurry with polymer, CVD, etc., (3) metal current collectors coated by conductive polymers, (4) gold plated metal foil (obviously cost prohibitive). For alkaline chemistry (e.g., KOH as an electrolyte component), the following current collector materials can be used: graphite, steel (e.g., nickel-plated steel or carbon-coated steel to reduce interface impedance). The design of flexible multi-battery assemblies provide good protection because the cells are singulated (and, therefore foil, edges are exposed) outside the electrolyte coverage. Furthermore, zinc salts in ionic liquids can be used in electrolyte layers as well as in one or both active material layers. In some examples, the pH is about neutral (6-8). Current collectors with carbon coating may be used.

In some examples, negative current collector are stable >−0.77V versus hydrogen potential, and preferably have low overvoltage of hydrogen evolution. Conventional alkaline cylindrical cells use brass nail or tin-coated brass or copper. Instead, flexible multi-battery assemblies described herein use copper of copper alloys (brass, bronze), tin-coated copper or brass; steel and carbon coated steel, carbon-coated copper, graphitic foil, zinc foil, metals with low overvoltage: indium, bismuth.

Examples of Flexible Multi-Battery Assemblies

FIG. 1A is a schematic illustration of flexible multi-battery assembly 200, in accordance with some examples. In this illustration, flexible multi-battery assembly 200 comprises three flexible electrochemical cells 100. However, one having ordinary skill in the art would understand that flexible multi-battery assembly 200 may include any number of flexible electrochemical cells 100, which may depend on the size of each cells and the size of flexible multi-battery assembly 200. For purposes of this disclosure the term "flexible" in as in flexible multi-battery assembly 200 or flexible electrochemical cells 100 refer to ability of that structure to reversibly bend to a bend radius of less than 40 millimeters or, more specifically, less than 30 millimeters or even less than 20 millimeters without any negative impacts to the performance of this structure. This flexibility allows using multi-battery assembly 200 for various applications, such as wristbands, sensors, smart labels, health and wellness devices, and flexible displays. For example, one or more flexible electrochemical cells of flexible multi-battery assembly 200 may be supplied as a part of shipping labels supplied as a roll.

Referring to FIG. 1A, flexible multi-battery assembly 200 comprises first current collector 210 and second current collector 220. First current collector 210 comprises first inner surface 211 and first outer surface 212. Furthermore, first current collector 210 is parsed into first plurality of current collector portions 215, not directly contacting each other. This parsing ensures electrical isolation of flexible electrochemical cells 100 in flexible multi-battery assembly 200. Prior to parsing, e.g., during one or more intermediate manufacturing stages further described below, flexible electrochemical cells 100 of (partially-fabricated) flexible multi-battery assembly 200 may be interconnected in parallel.

Second current collector 220 also comprise second inner surface 221 and second outer surface 222. In some examples, e.g., shown in FIG. 2B, second current collector 220 is also parsed into second plurality of current collector portions 225, not directly contacting each other. Alternatively, second current collector 220 is a continuous layer extending across and shared by multiple flexible electrochemical cells 100 as, e.g., shown in FIG. 1A. In these examples, second current collector 220 may be used to provide mechanical support to other components of flexible multi-battery assembly 200.

Figure 3A:
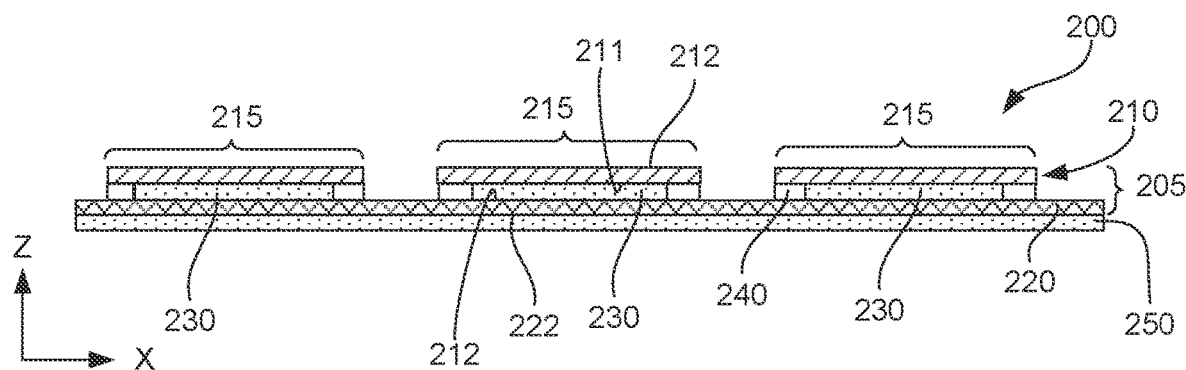
FIGS. 3A-3D are schematic cross-sectional views of different examples of the flexible multi-battery assembly, showing an insulator layer attached to each either the first current collector or the second current collector.

The orientation of first current collector 210 and second current collector 220 in flexible multi-battery assembly 200 is such that first inner surface 211 and second inner surface 221 face each other, while first outer surface 212 and second outer surface 222 face away from each other. Furthermore, at least one of first outer surface 212 and second outer surface 222 is fully exposed. FIG. 1A illustrates an example of flexible multi-battery assembly 200 in which both first outer surface 212 and second outer surface 222 are exposed. FIG. 3A illustrates an example of flexible multi-battery assembly 200 in which only first outer surface 212 is exposed, while second outer surface 222 is adhered to insulator layer 250. FIG. 3C illustrates an example of flexible multi-battery assembly 200 in which only second outer surface 222 is exposed, while first outer surface 212 is adhered to insulator layer 250. Exposure of one or both first outer surface 212 and second outer surface 222 allows reducing the number of components in flexible multi-battery assembly 200 and simplifying the process of forming electrical connections to first current collector 210 and/or second current collector 220.

Figure 1B:
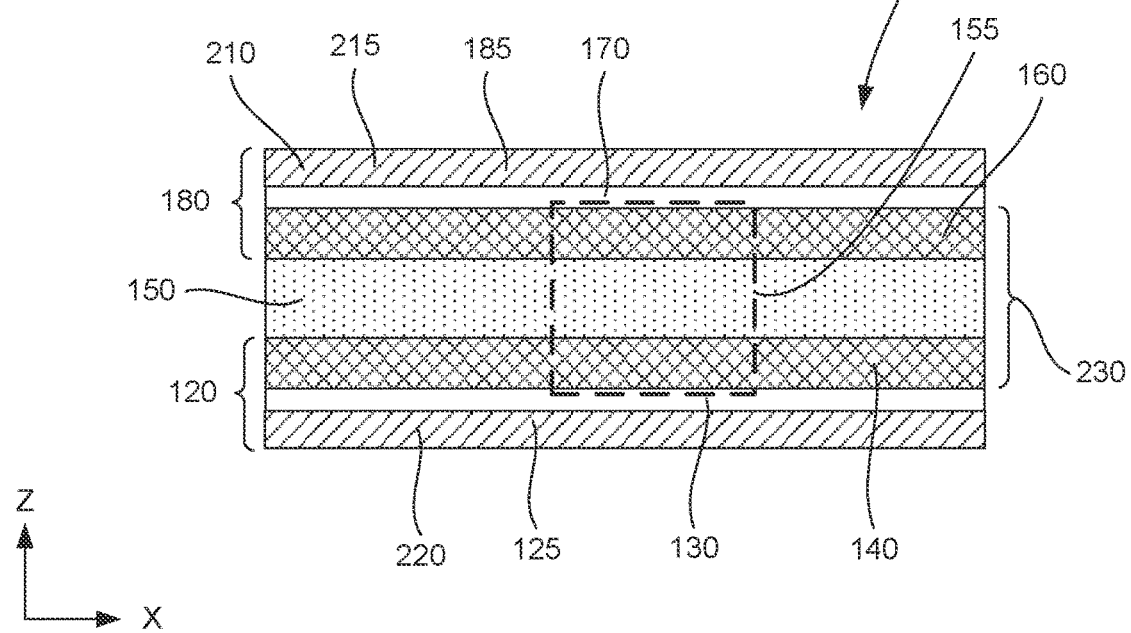
FIGS. 1B and 1C are expanded cross-sectional views of two examples of a portion of the flexible multi-battery assembly in FIG. 1A, illustrating additional features of electrochemically active stacks.

In some examples, e.g., shown in FIG. 1B, first current collector 210 is negative current collector 185, while second current collector 220 is positive current collector 125. In alternative examples, e.g., shown in FIG. 1C, first current collector 210 is positive current collector 125, while second current collector 220 is negative current collector 185. First current collector 210 and second current collector 220 provides electronic conductivity between corresponding active material layers and external components connected to flexible multi-battery assembly 200 or, more specifically, to one or more flexible electrochemical cells 100. In some examples, portions of first current collector 210 and second current collector 220, which are free from corresponding active material layers and which extends outside of the boundaries of plurality of electrochemically active stacks 230 are operable as connection tabs. Furthermore, in some examples, portions of first current collector 210 and second current collector 220 may be shared with other components of the same electronic circuit.

In some examples, positive current collector 125 is a metal foil having a thickness of between 1 micrometer and 80 micrometers or, more specifically, between 5 micrometer and 30 micrometers. Other examples of positive current collector 125 include graphite foil, foil made from carbon nanotubes (with or without a binder, metal-plated fibers, metal foams (e.g., nickel foam or copper foam, screens and extended metal structures, grids, woven metal mesh, printed layer (e.g., comprising a polymer binder and a conductive additive, and the like. In the same or other examples, positive current collector 125 is formed from, or at least comprises, one or more of nickel, stainless steel, regular steel, titanium, and aluminum.

In some examples, positive current collector 125 is printable. Printable current collector allows placement, attachment or lamination of metal current collector with complex geometries, e.g., around other components of the circuitry. Printable current collector may comprise a polymer and a conductive filler. Some examples of conductive fillers, include but are not limited to, carbon, graphite, graphene, carbon nanotubes, or metal particles such as nickel, steal, and silver.

In some examples, negative current collector 185 is a metal foil or a metal screen having a thickness of between 1 micrometer and 80 micrometers or, more specifically, between 5 micrometers and 30 micrometers. Thinner structures provide more flexibility, but less structural integrity and electronic conductivity. In some examples, negative current collector 185 is formed from, or at least comprises, one or more of copper (e.g., copper alloy, brass, steel or stainless steel, copper, and zinc. In other examples, negative current collector 185 is a printed layer, comprising a polymer binder and a conductive additive. Some examples of the conductive additive used for a printed example of negative current collector 185 include, but are not limited to, silver, brass, indium, carbon, nickel, and copper. An example of negative current collector 185 may be formed using one or more of ink jet printing, screen printing, stencil printing, flexographic printing, and/or slot die coating.

Flexible multi-battery assembly 200 further comprising plurality of electrochemically active stacks 230, disposed between and directly contacting first inner surface 211 of first current collector 210 and second inner surface 221 of second current collector 220. As shown in FIG. 1A, each of plurality of electrochemically active stacks 230 directly contacts one of first plurality of current collector portions 215. In more specific examples, each of plurality of electrochemically active stacks 230 directly contacts only one of first plurality of current collector portions 215.

Figure 1C:
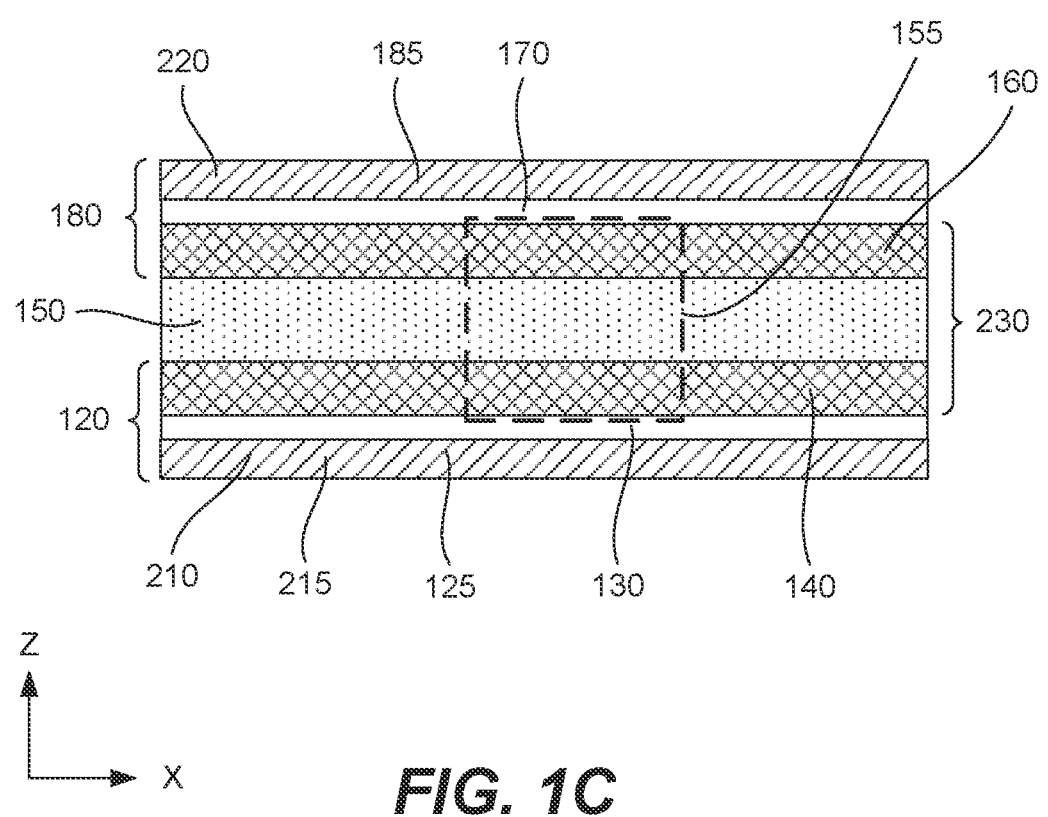

Referring to FIGS. 1B and 1C, each of the plurality of electrochemically active stacks 230 comprises positive active material layer 140, electrolyte layer 150, and negative active material layer 160. Electrolyte layer 150 is positioned between and ionically coupled to each of positive active material layer 140 and negative active material layer 160. Positive active material layer 140, electrolyte layer 150, and negative active material layer 160 provide ionic exchange during charge and discharge of each electrochemical cell 100 in flexible multi-battery assembly 200.

Furthermore, positive active material layer 140 is electronically coupled to positive current collector 125, either directly or through one or more other components, such as positive interface layer 130. Likewise, negative active material layer 160 is electronically coupled to negative current collector 185, either directly or through one or more other components, such as conductive layer 170.

Figure 1D:
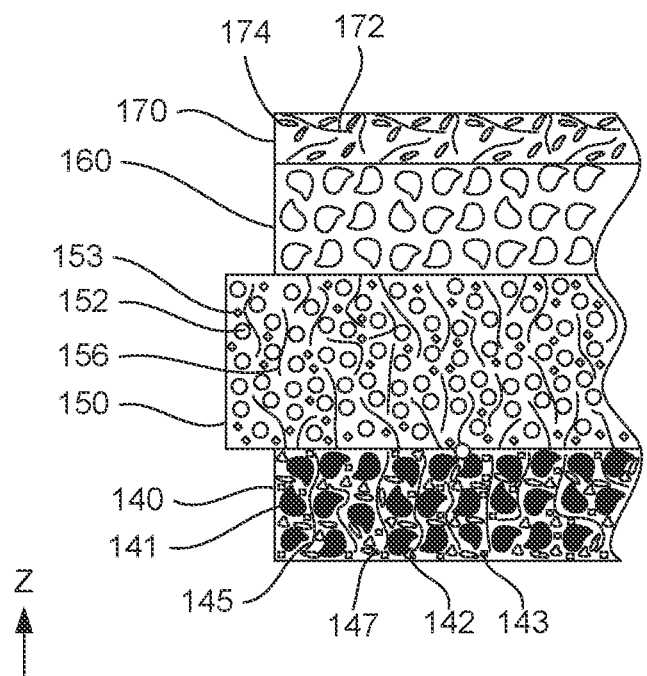
FIGS. 1D and 1E are expanded cross-sectional views of different examples of the electrochemically active stacks.

In some examples, positive active material layer 140 comprises positive active material 141 and positive layer binder 145 as schematically shown in FIG. 1D. In some examples, positive active material 141 comprises or consists essentially of a metal oxide or, more specifically, transition metal oxide (e.g., containing a metal from the 4th row of the Periodic Table of the Elements), such as manganese oxide ($MnO_2$), nickel oxide ($NiO_2$), vanadium oxide ($V_2O_5$), ferric phosphate ($FePO_4$), cobalt oxide ($CoO_2$), lead oxide (PbO), and chromium oxide ($Cr_2O_3$). In some examples, positive active material layer 140 further comprises conductive additive 147, such as conductive carbons (e.g., carbon black, graphite, carbon nanotubes, graphene), or conductive nanoparticles (e.g., metal nanoparticles). In some examples, positive active material layer 140 further comprises positive active layer ionic liquid 142, which may be the same as or different from electrolyte ionic liquid 152. Some examples of positive active layer ionic liquid 142 are 1-ethyl-3-methyl imidazolium bis(trifluoromethylsulfonyl) imide (EMIM TFSI), represented by the formula $C_8H_{11}F_6N_3O_4S_2$, and 1-ethyl-3-propyl pyrrolidinium bis(trifluoromethylsulfonyl) imide, imidazolium, pyrrolidinium, piperidinium, tetraalkyl ammonium ionic liquids with variety of anions: bis(trifluoromethane)sulfonimide (TFSO), trifluormethylsulfonyl (TFS), bis(fluorosulfonyl)imide (FSI), tetrafluoroborate ($BF_4^-$), bis(oxalato)borate (BOB), and the like. In some examples, positive active material layer 140 further comprises positive layer salt 143, such as zinc(II) bis (trifluoromethanesulfonyl)imide (Zn-TFSI), represented by the following formula $Zn(C_2F_6NO_4S_2)_2$, zinc chloride (ZnCl2), zinc fluoroborate ($Zn(BF_4)_2$), ammonium chloride ($NH_4Cl$), ammonium tetrafluoroborate ($NH_4BF_4$), potassium hydroxide (KOH), and the like.

Also shown in FIG. 1B is positive interface layer 130, which is optional and when presented, operable as a primer or adhesion-promoter between the binder of positive active material layer 140 and positive current collector 125. Unlike positive active material layer 140, positive interface layer 130 comprises much higher amounts of polymer binders, such as at least about 5% by weight (e.g., between about 5% and 30%) or at least about 10% by weight or even at least about 20%. Positive interface layer 130 may be printed over positive current collector 125 using ink comprising, e.g., carbon black, PVDF, and n-methyl-2-pyrrolidone (NMP). The thickness of positive interface layer 130 may be between 0.5 micrometers and 5 micrometers or, more specifically, between 1 micrometer and 2 micrometers.

As noted above electrolyte layer 150 provides ionic communication between negative electrode 180 and positive electrode 120 or, more specifically, between negative active material layer 160 and positive active material layer 140. In some examples, electrolyte layer 150 comprises electrolyte binder 156, electrolyte ionic liquid 152, and electrolyte salt 153. Some examples of electrolyte binder 156 include, but are not limited to, polymers and copolymers of trifluoroethylene, tetrafluoroethylene, vinylidene chloride, vinylidene difluoride (difluoroethylene), hexafluoropropylene, styrene, butadiene, ethylene oxides, acrylate and/or methacrylate esters, variations and rubbers thereof, and so forth, as well as polyesters, polyanilines, polyethers, polyimides, copolymers and blends thereof, so forth. More specific examples include poly(vinylidene fluoride) (PVDF), poly(vinylidene fluoride-hexaflouropropylene) (PVDF-HFP), polyvinyl alcohol (PVA), poly(ethylene oxide) (PEO), poly(acrylonitrile) (PAN), and poly(methyl methacrylate) (PMMA), epoxy derivatives, and silicone derivatives. Electrolyte ionic liquid 152 enhances ionic conductivity of electrolyte layer 150. In some examples, the ionic conductivity of electrolyte layer 150 is between 2.3 mS/cm and 2.7 mS/cm. Electrolyte ionic liquid 152 comprises anions and cations, which, in some examples, are organic cations or inorganic cations. Some examples of these organic cations are imidazolium, pyrrolidinium, ammonium, pyridinium, piperidinium, phosphonium, sulfonium, and tetraalkyl ammonium. Some examples of inorganic cations include, but are not limited to, Li, Zn, Na, Al, Mn, Mg, and Y (yttrium) ions. Examples of anions include, but are not limited to, organosulfonate (e.g., methanesulfonate [mesylate], trifluoromethanesulfonate [triflate], toluenesulfonate [tosylate], so forth), organosulfimide (e.g., bis((methyl)sulfonyl)imide [mesylate sulfimide, or MSI]), bis(trifluoromethylsulfonyl)-imide [TFSI]), sulfate, phosphate, organophosphate, organoborate (e.g., trialkyl borate, chelated organoborate, bis(oxalo)borate, so forth), tetrachloroborate, aluminate, dicyanamide, carboxylate (e.g., formate, acetate), perchlorate, nitrate and halide (e.g., chloride, bromide, iodide). Additional anions examples include 1-butyl-3-methylimidazolium perchlorate, 1-butyl-3-methylimidazolium hydroxide, 1-butyl-3-methyl-imidazolium trifluoromethanesulfonate, 1-butyl-3-methyl-imidazolium methanesulfonate, 1-butyl-2,3-dimethylimidazolium methanesulfonate, 1-butyl-2,3-dimethylimidazolium trifluoromethanesulfonate, 1-butyl-1-methylpyrrolidinium methanesulfonate, 1-butyl-1-methylpyridinium methanesulfonate, 1-butyl-1-methylpyridinium trifluoromethanesulfonate, 1-ethyl-1-methyl-pyrrolidinium methanesulfonate, 1-ethyl-1-methylpyrrolidinium trifluoromethanesulfonate, 1-methyl-1-propyl-pyrrolidinium methanesulfonate, 1-ethyl-1-methylpyrrolidinium trifluoromethanesulfonate, 1-ethyl-3-methylimidazolium (EMIM) methanesulfonate, 1-ethyl-3-methyl-imidazolium (EMIM) hydroxide, 1-ethyl-3-methylimidazolium (EMIM) trifluoromethanesulfonate, 1-butyl-3-methylimidazolium (BMIM) formate, 1-butyl-2,3-dimethylimidazolium formate, 1-butyl-1-methylpyrrolidinium formate, 1-butyl-3-methylimidazolium acetate, 1-butyl-1-methylpyrrolidinium acetate, 1-butyl-1-methylpyrrolidinium trifluoromethanesulfonate, 1-butyl-1-methylpyrrolidinium tetrachloroborate, 1-butyl-1-methylpyridinium tetrachloroborate, 1-ethyl-1-methylpyrrolidinium tetrachloroborate, 1-ethyl-3-methyl-imidazolium tetrachloroborate, 1-ethyl-1-methylpyrrolidinium trifluoromethanesulfonate, 1-methyl-1-propylpyrrolidinium tetrachloroborate, 1-methyl-1-propylpyrrolidinium trifluoromethanesulfonate, 1-butyl-3-methylimidazolium propionate, 1-butyl-1-methylpyrrolidinium propionate, 1-butyl-3-methylimidazolium tetraphenylborate, 1-butyl-3-methylimidazolium bis(fluorosulfonyl)imide, 1-butyl-3-methylimid-azolium bis(trifluoromethane)sulfonimide, 1-butyl-2,3-dimethyl-imidazolium tetraphenylborate, 1-butyl-2,3-dimethyllimidazolium bis(fluorosulfonyl)imide, 1-butyl-2,3-dimethylimidazolium bis(trifluoromethane)sulfonimide, 1-butyl-3-methylimidazolium bis(methylsulfonyl)imide, 1-butyl-2,3-dimethyllimidazolium bis((methyl)sulfonyl)imide, 1-butyl-3-methylimidazolium bis-((methyl)sulfonyl)amide, 1-butyl-1-methylpyrrolidinium bis((methyl)sulfonyl)imide, 1-butyl-1-methylpyrrolidinium bis(fluorosulfonyl)imide, 1-butyl-1-methyl-pyrrolidinium bis(trifluoro-methane)sulfonimide, 1-butyl-1-methylpyridinium bis(methylsulfonyl)imide, 1-ethyl-1-methyl-pyrrolidinium bis(methylsulfonyl)imide, 1-ethyl-1-methyl-pyrrolidinium bis(fluorosulfonyl)-imide, 1-ethyl-1-methyl-pyrrolidinium bis(trifluoromethane)sulfonimide, 1-ethyl-3-methylimid-azolium bis(methylsulfonyl)imide, 1-ethyl-3-methylimid-azolium bis(fluorosulfonyl)imide, 1-ethyl-3-methyl-imidazolium (EMIM) bis(trifluoromethane)-sulfonimide, 1-methyl-1-propyl-pyrrolidinium bis((methyl)sulfonyl)imide, 1-methyl-1-propylpyrrolidinium bis(fluorosulfonyl)-imide, 1-methyl-1-propylpyrroldinium bis(trifluoromethane)sulfonimide, 1-butyl-2,3-dimethyl-imidazolium bis((methyl)sulfonyl)amide, 1-butyl-2,3-dimethylimidazolium bis(fluorosulfonyl)-imide, 1-butyl-2,3-dimethylimidazolium bis(trifluoromethane)sulfonimide, 1-butyl-1-methyl-pyrrolidinium bis((methyl)sulfonyl)amide, 1-butyl-1-methylpyridinium bis(methyl sulfonyl)-amide, 1-butyl-1-methylpyrrolidinium bis(fluorosulfonyl)imide, 1-butyl-1-methylpyrrolidinium bis(trifluoromethane)sulfonimide, 1-ethyl-1-methylpyrrolidinium bis(methylsulfonyl)amide, 1-ethyl-3-methylimidazolium bis((methyl)sulfonyl)amide, 1-ethyl-1-methylpyrrolidinium bis-(fluorosulfonyl)imide, 1-ethyl-1-methylpyrrolidinium bis-(trifluoromethane)sulfonimide, 1-methyl-1-propylpyrrolidinium bis(methyl sulfonyl)amide, 1-methyl-1-propylpyrrolidinium bis(fluorosulfonyl)imide, 1-methyl-1-propylpyrroldinium bis(trifluoromethane)sulfonimide, 1-butyl-3-methylimidazolium propionate, and 1-butyl-1-methyl-pyrrolidinium propionate. One specific example of electrolyte ionic liquid 152 is 1-butyl-3-methylimidazolium trifluoromethanesulfonate $[C_9H_{15}F_3N_2O_3S]$. Overall, ionic liquids, which are electrochemically stable in the operating voltage range of zinc and manganese dioxide electrodes may be used. Furthermore, ionic liquids that do not react with moisture and oxygen may be used allowing to perform deposition processes (e.g., printing) in the ambient environment.

In some examples, electrolyte salt 153 comprises multivalent metal ions, such as zinc, aluminum, magnesium, and/or yttrium ions. In some examples, the anion of electrolyte salt 153 is identical or chemically similar to the anion of electrolyte ionic liquid 152. Some example of such anions include, but are not limited to, chlorides, tetrafluoroborate $(BF_4^-)$, trifluoroacetate $(CF_3CO_2^-)$, trifluoromethansulfonate $(CF_3SO_3^-)$, hexafluorophosphate $(PF_6^-)$, bis(trifluoromethylsulfonyl)amide $(NTf_2^-)$, and bis(fluorosulfonyl)imide $(N(SO_2F)_2)$. One specific example of a salt is zinc trifluoromethanesulfonate $[Zn(CF_3SO_3)_2]$. In some examples, an ionic liquid is partially or completely replaced with a low vapor pressure solvent.

In some examples, one or more ionic liquids completely replace organic solvents, conventionally used in electrolytes of flexible electrochemical cells. As such, flexible electrochemical cell 100 is substantially free from organic solvents, e.g., the amount of organic solvents in flexible electrochemical cell 100 is less than 1% by weight or even less than 0.1% by weight.

In some examples, negative active material layer 160 is printed or otherwise positioned over electrolyte layer 150. Negative active material layer 160 may comprise or consist essentially (e.g., at least 95% by weight or even at least 99% by weight) of an elemental metal. The elemental metal may be one providing monovalent ions (e.g., $Li^+$, $Na^+$, $Cu^+$ or polyvalent ions (e.g., $Zn^{2+}$, $Ni^{2+}$, $Al^{3+}Ga_+$, $Co^{3+}$, $Ca^{2+}$. $Mg^{2+}$, so forth. In some examples, negative active material layer 160 is operable to emit multivalent ions when undergoing an oxidation reaction. For example, zinc metal forms zinc ions of divalent charge ($Zn^{2+}$). In some examples, negative active material layer 160 comprises structures having multiple different morphological features (e.g., zinc flakes and spherical particles and nanoparticles to increase electrode capacity and rate of discharge. Negative active material layer 160 may also comprise a polymer, and in some cases, a polymer and a conductive additive. The conductive additive may be a carbon material (e.g., carbon black, graphite, nanotubes, graphene or a metal. For example, metals with low overvoltage of hydrogen evolution may be used to minimize side reactions. Some examples include indium, bismuth, brass, lead, and mercury.

Referring to FIG. 1B, conductive pressure sensitive adhesive layer 170 provides electro-mechanical connection between negative current collector 185 and negative active material layer 160. In some examples, conductive pressure sensitive adhesive layer 170 comprises polymer base 172 and conductive filler 174. Some examples of polymer base 172 include, but are not limited to, an acrylic polymer, isobutylene (e.g., polyisobutylene (PIB and other hydrocarbons, or silicones. Some examples of conductive filler 174 include, but are not limited to, metal particles, carbon-based particles, and the like. Some examples of metal particles include, but are not limited to, nickel particles, copper particles, indium particles, bismuth, brass, and silver particles. The particle size of conductive filler 174 of conductive pressure sensitive adhesive layer 170 may be between 1 micrometers and 100 micrometers or, more specifically, between 1 micrometers and 35 micrometers. The concentration of conductive filler 174 in conductive pressure sensitive adhesive layer 170 is less than about 60% by volume or, more specifically, less than about 30% by volume. At such low concentrations of conductive filler 174, the particles of conductive filler 174 are encapsulated by polymer base 172, further electrochemically isolating conductive filler 174 from the environment and, especially, from electrolyte layer 150.

In some examples, the thickness of flexible multi-battery assembly 200 is less than 400 micrometers or, more specifically, less than 300 micrometers, and even less than 250 micrometers. One having ordinary skills in the art would recognize that forming a thin flexible electrochemical structure is rather challenging. Each layer of the overall structure contributes to the total thickness, which is conventionally in a millimeter range. Reducing the thickness to less than 400 micrometers or more opens doors to new applications of flexible multi-battery assemblies 200 and individual flexible electrochemical cells 100, especially, in combination with high flexibility, which is described above. For example, flexible multi-battery assemblies 200 and/or individual flexible electrochemical cells 100 may be used in sensors, smart labels, health and wellness devices, and flexible displays.

Such low thickness values are achieved, for example, by eliminating independent support layers (e.g., a thick PET layer extending between different cells in flexible multi-battery assembly 200) and instead relying on first current collector 210 and/or second current collector 220 for mechanical support between the cells. For example, one or both of first current collector 210 and second current collector 220 extends across multiple electrochemically active stacks 230, effectively forming multiple cells integrated by the current collector. Furthermore, one or both of first current collector 210 and second current collector 220 may be exposed with no external insulating layers, thereby further reducing the thickness of flexible multi-battery assembly 200. Instead of relying on additional components to provide environmental insulation, one or both of first current collector 210 and second current collector 220 seal and isolate the internal components (e.g., positive active material layer 140, electrolyte layer 150, and negative active material layer 160) from the environment. First current collector 210 and second current collector 220 are attached to each other using, e.g., boundary insulator 240, which is another component of the overall seal. It should be noted that, in some examples, one or both of first current collector 210 and second current collector 220 are metal and that metals tend to provide better moisture and gas barrier properties than, e.g., polymers which are conventionally used as external components in other types of cells. Furthermore, additional thickness reduction is achieved by printing components (e.g., positive active material layer 140, electrolyte layer 150, and/or negative active material layer 160) directly on the top of each other and, in some examples, directly over first current collector 210 and/or second current collector 220 thereby eliminating the need to form interfaces (e.g., using conductive adhesive and such).

In one example, first current collector 210 is an aluminum foil, having a thickness of 20 micrometers. Positive active material layer 140 has a thickness of 80 micrometers, while electrolyte layer 150 has a thickness of 40 micrometers, and negative active material layer 160 has a thickness of 100 micrometers. Finally, second current collector 220 is a copper foil which has a thickness of 10 micrometers. Positive active material layer 140 directly interfaces first current collector 210 and electrolyte layer 150, while negative active material layer 160 directly interfaces second current collector 220 and electrolyte layer 150. Both first current collector 210 and second current collector 220 are exposed. The total thickness of this flexible electrochemical cell is 250 micrometers. In another example, first current collector 210 is a graphite foil, having a thickness of 150 micrometers, while all other components are the same as above. The total thickness of the flexible electrochemical cell in this new example is 380 micrometers. In yet another example, a conductive adhesive layer (having a thickness of 2 micrometers) and a conductive film (having a thickness of 75 micrometers) are added between first current collector 210 (which is still an aluminum foil, having a thickness of 20 micrometers) and positive active material layer 140. The total thickness of the flexible electrochemical cell in this example is 327 micrometers. The conductive film is added to protect first current collector 210 from various components in electrochemically active stack 230, such as chloride ions in electrolyte layer 150 and positive active material layer 140. This example allows using new substrate materials and/or electrolyte materials, which would be otherwise not compatible, without sacrificing the performance and maintaining the total thickness below 400 micrometers.

Examples of Exposed Current Collectors

In some examples, second current collector 220 is a continuous structure providing support to plurality of electrochemically active stacks 230 relative to each other. In more specific examples, second outer surface 222 is exposed. First outer surface 222 may be also exposed as, e.g., is shown in FIG. 1A. Alternatively, first outer surface 222 may be covered and adhered to insulator layer 250 as, e.g., is shown in FIG. 3C.

In some examples, flexible multi-battery assembly 200 further comprises boundary insulator 240 disposed between and directly contacting first inner surface 211 of first current collector 210 and second inner surface 221 of second current collector 220. Boundary insulator 240 surrounds each of plurality of electrochemically active stacks 230. As such, a combination of first current collector 210, second current collector 220, and boundary insulator 240 isolates plurality of electrochemically active stacks 230 from the environment. Furthermore, in some examples, boundary insulator 240 is adhered to first inner surface 211 and second inner surface 221 thereby supporting first current collector 210 and second current collector 220 relative to each other. Additional mechanical support may be provided by plurality of electrochemically active stacks 230.

Referring to FIG. 1A, in some examples, boundary insulator 240 comprises a plurality of disjoined structures, each surrounding one of plurality of electrochemically active stacks 230. In these examples each disjoined structure of boundary insulator 240 is separated from any other disjoined structure. The overall support in flexible multi-battery assembly 200 may be provided by first current collector 210, second current collector 220, and/or insulator layer 250 (if one is present).

Figure 2A:
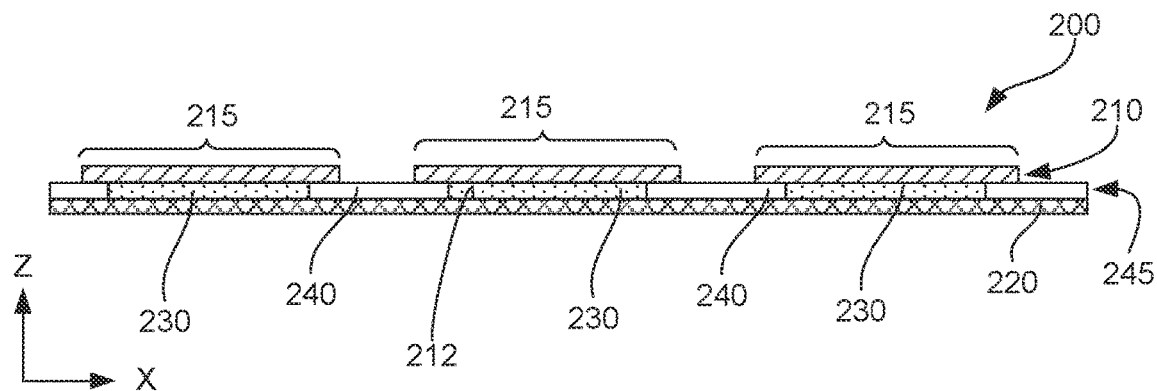
FIGS. 2A and 2B are schematic cross-sectional views of two examples of the flexible multi-battery assembly, showing boundary insulator extending between each of adjacent pair of the plurality of electrochemically active stacks.
Figure 2B:
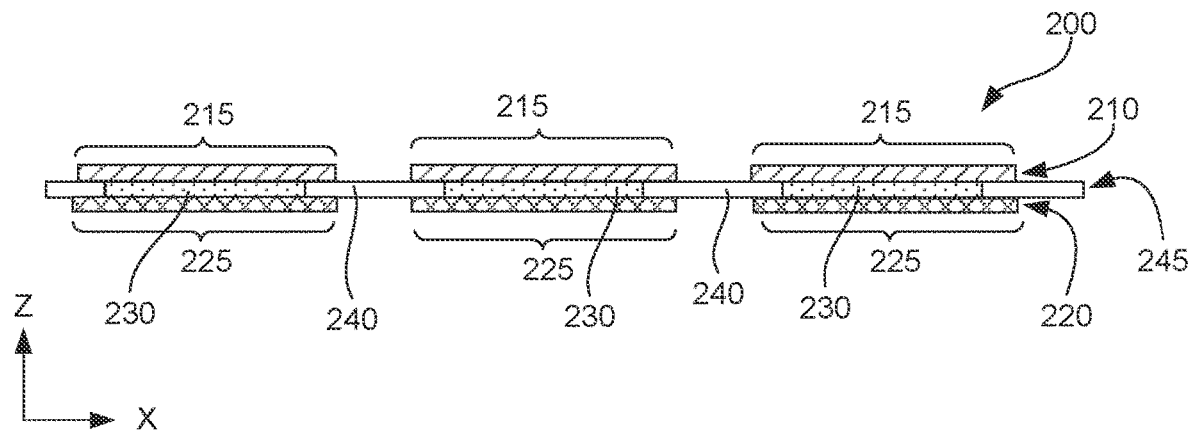

Referring to FIGS. 2A and 2B, in some examples, boundary insulator 240 continuously extends between each of adjacent pair of plurality of electrochemically active stacks 230. In these examples, boundary insulator 240 provides support to plurality of electrochemically active stacks 230 relative to each other. Furthermore, in these examples, second current collector 220 may be parsed into second plurality of current collector portions 225, not directly contacting each other (in addition to first current collector 210 being parsed into first plurality of current collector portions 215).

In some examples, boundary insulator 240 comprises a printed adhesive (acrylic, PIB, silicone, etc.) or adhesive disposed from a syringe, for example. In other examples, boundary insulator 240 is a patterned adhesive on a release liner that is roll-to-roll applied to the substrate with printed layers. Furthermore, boundary insulator 240 may be a plastic insulating film (PP, PE, PET, etc.) with adhesive on both sides. In some examples, boundary insulator 240 is a hot melt kind adhesive if the lamination follows shortly thereafter (within seconds, less than a minute). Boundary insulator 240 may be be first created (printed, dispersed, patterned on the negative current collector as below; and then the layers are laminated. So, you still get a structure as on FIG. 1D but with a different sequence of events.

Figure 3B:
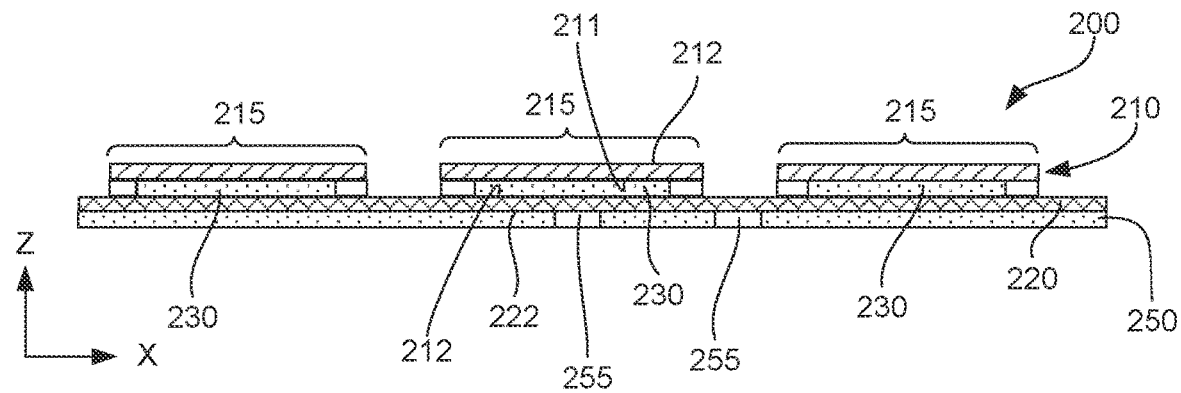
Figure 3C:
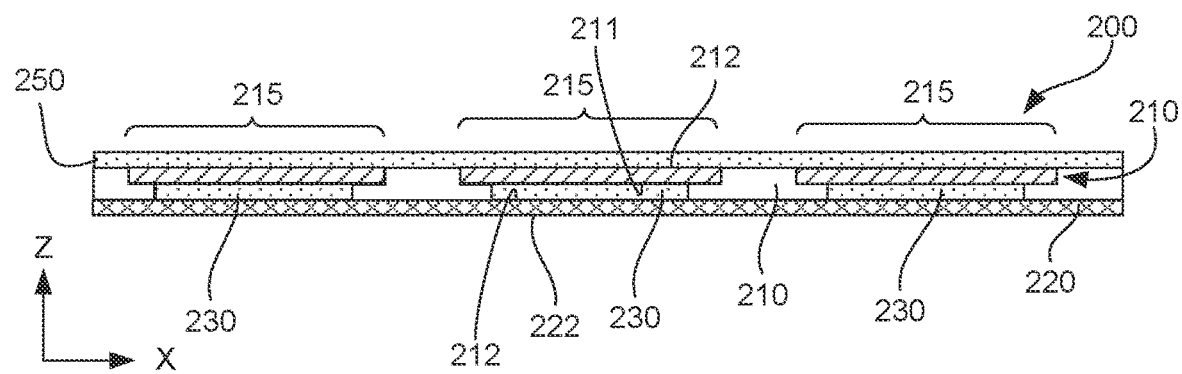

Referring to FIGS. 3A-3C, in some examples, flexible multi-battery assembly 200 further comprises insulator layer 250, adhered to either one of first outer surface 212 or second outer surface 222. The remaining components (everything but insulator layer 250) of flexible multi-battery assembly 200 may be collectively referred to as component stack 205 and include first current collector 210, second current collector 220 and plurality of electrochemically active stacks 230, disposed between first current collector 210, second current collector 220.

It should be noted that the one of first outer surface 212 or second outer surface 222 is exposed. FIGS. 3A and 3B illustrate an example when insulator layer 250 is adhered second outer surface 222, while first outer surface 212 is exposed. FIG. 3C illustrates an alternative example when insulator layer 250 is adhered first outer surface 212, while second outer surface 222 is exposed. Some examples of insulator layer 250 are paper (e.g. cardstock or different types/weaves/thicknesses of paper, polymeric or plastic materials (e.g., polyethylene tetrephthalate or polyester (PET, polyethylene, polypropylene, Kapton, polyimide, polyester ether ketone (PEEK, polyurethane, polydimethysiloxane or other silicone resins, fabric of various weaves and meshes (e.g. nylon, cotton, denim silicon, printed circuit board (e.g. cured epoxy resin substrates, FR4, and flexible circuit boards, glass, metal foil, or combination thereof (e.g. fabric with plastic backing. In some examples, at least one of insulator layer 250 is a microprocessor or a MEMS device. At least one of insulator layer 250 may include an adhesive backing for attaching to other components. In some examples, insulator layer 250 is a printable layer. A printable insulator layer 250 allows lamination, placement or attachment of this layer in limited spaces, e.g., due to other components of the circuitry.

Referring to FIG. 3B, in some examples, insulator layer 250 comprises one or more insulator openings 255. Insulator openings 255 provide access to either other first outer surface 212 or second outer surface 222 (see FIG. 3B). In other words, one or more portions of one of first outer surface 212 or second outer surface 222 is exposed through one or more insulator openings 255.

Referring to FIG. 3B, in some examples, the footprint of at least one of one or more insulator openings 255 coincides with one of plurality of electrochemically active stacks 230. As such, an electrical contact can be formed to first outer surface 212 and/or second outer surface 222 insulator openings 255 and over the one of plurality of electrochemically active stacks 230, which helps to reduce the overall footprint of flexible electrochemical cells 100 and of flexible multi-battery assembly 200. More specifically, at least some of one or more portions of one of first outer surface 212 or second outer surface 222, exposed through one or more insulator openings 255, have corresponding exposed portions of opposite ones of first outer surface 212 or second outer surface 222. In other words, electrical connections can be formed to both first outer surface 212 and second outer surface 222 at the same position in the footprint of flexible electrochemical cell 100.

Referring to FIGS. 3A and 3B, in some examples, second current collector 220 is a continuous structure and insulator layer 250 is adhered to second outer surface 222 of second current collector 220. In this example, both second current collector 220 and insulator 250 may provide support to plurality of electrochemically active stacks 230 relative to each other. Furthermore, insulator layer 250 may comprise disjoined patches and the support to plurality of electrochemically active stacks 230 is provided by second current collector 220.

Figure 3D:
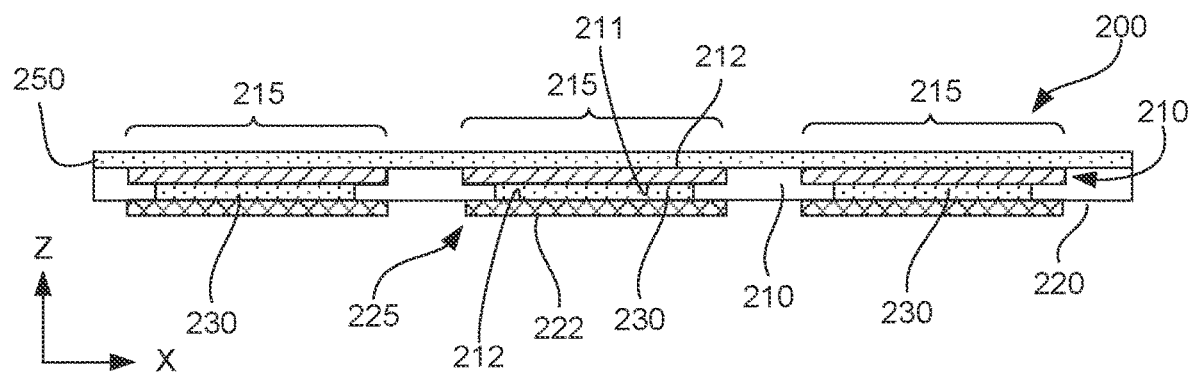

Referring to FIGS. 3C and 3D, in some examples, insulator layer 250 is adhered to first outer surface 212. When insulator layer 250 is continuous and provides support to plurality of electrochemically active stacks 230, second current collector 220 may be parsed into second plurality of current collector portions 225, not directly contacting each other, as for, example is shown in FIG. 3D.

Figure 3E:
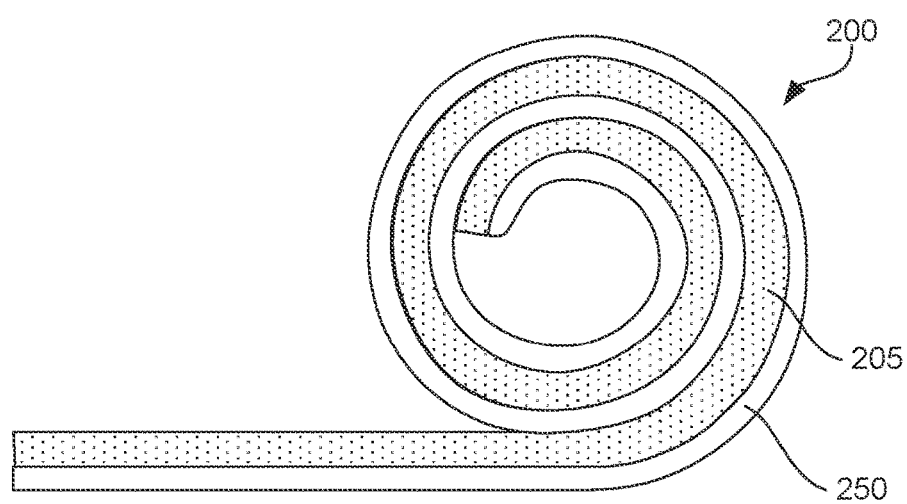
FIG. 3E is a schematic cross-sectional view of the flexible multi-battery assembly arranged into a roll, in accordance with some examples.

In some examples, flexible multi-battery assembly 200 is flexible and can be arranged into a roll as, for example, is shown in FIG. 3E. In this arrangement, insulator layer 250 helps to prevent electrical contact between current collectors of adjacent windings.

Figure 4A:
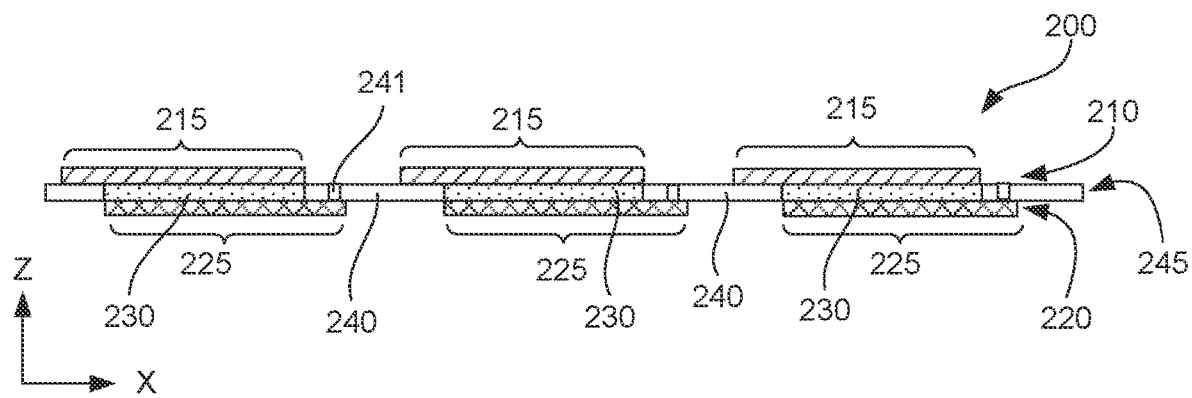
FIGS. 4A-4D are schematic views of the flexible multi-battery assembly with portions of the first current collector and the second current collector accessible for making electrical connections, in accordance with some examples.

FIG. 4A is a schematic cross-sectional view of flexible multi-battery assembly 200 showing first plurality of current collector portions 215 being offset along the X axis relative to second plurality of current collector portions 225. This offset allows to form electrical connections to both current collector portions without interfering with plurality of electrochemically active stacks 230. The connections can be formed from the same side (e.g., through opening 241 in boundary insulator 240) or different sides.

Figure 4B:
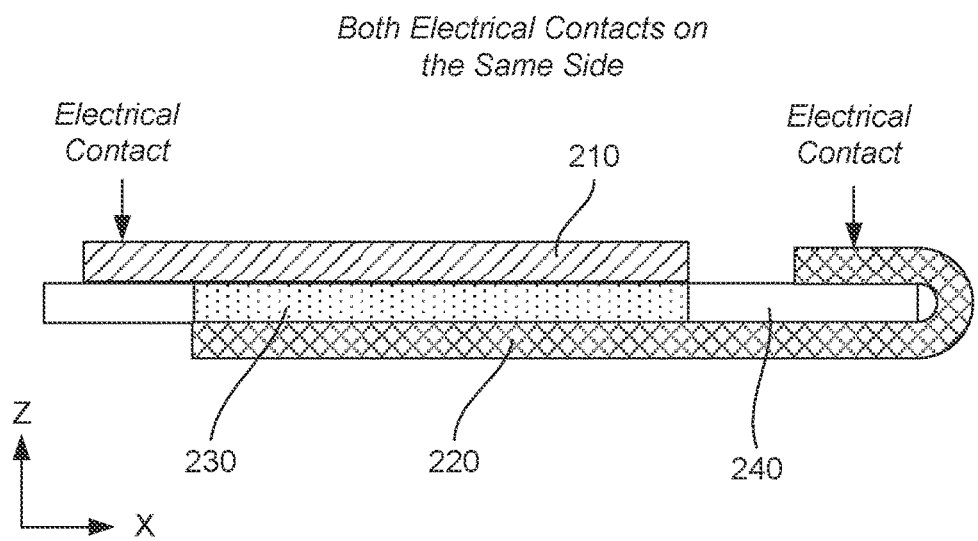

FIG. 4B is a schematic cross-sectional view of flexible multi-battery assembly 200 showing a portion of second current collector 220 wrapping around an edge of boundary insulator 240 and positioned on the same level as first current collector 220. This arrangement of current collectors allows forming electrical connections from the same side.

Figure 4C:
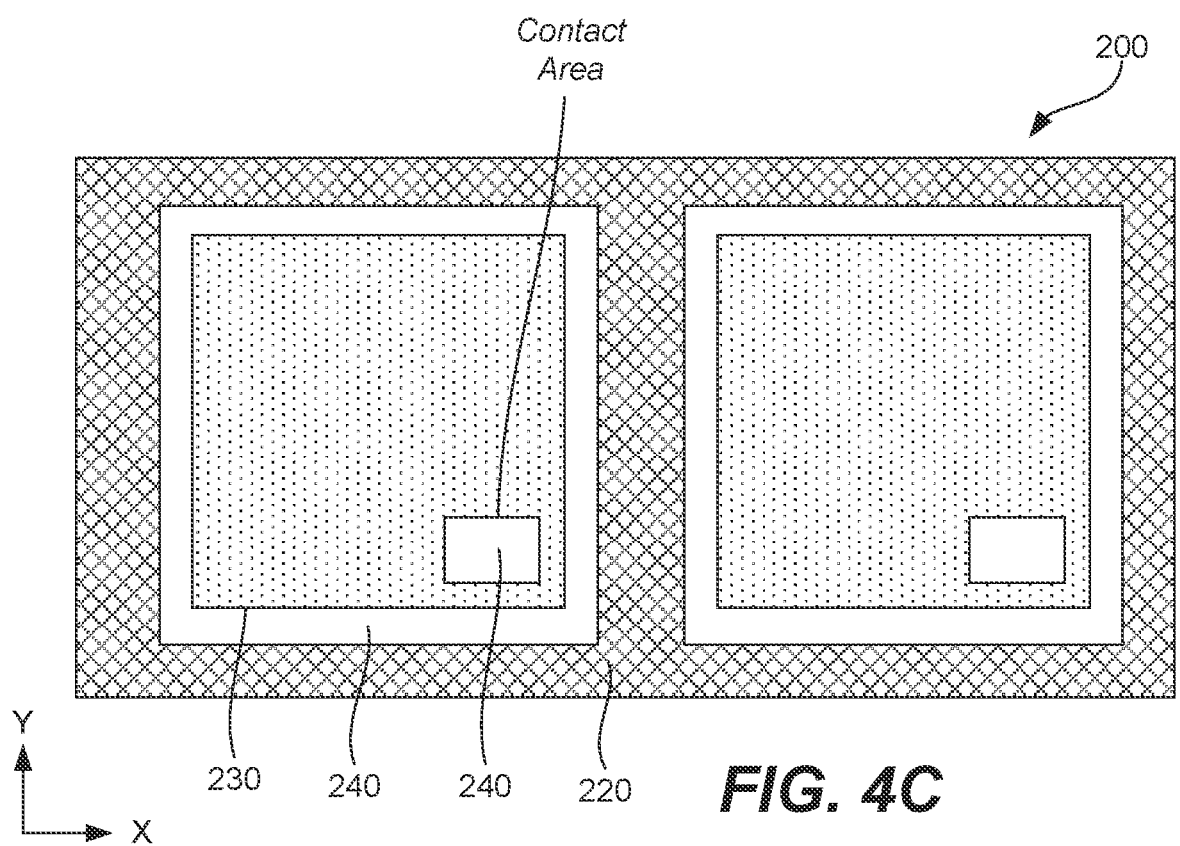

FIG. 4C is a schematic top view of flexible multi-battery assembly 200 showing a contact area formed within the boundary of each of plurality of electrochemically active stacks 230. Specifically, the contact area is formed by printing a portion of boundary insulator 240 over a portion of each of plurality electrochemically active stacks 230 or directly over second current collector 220. Another portion of boundary insulator 240 may surround each of plurality of electrochemically active stacks 230 as, for example, is shown in FIG. 4C.

Figure 4D:
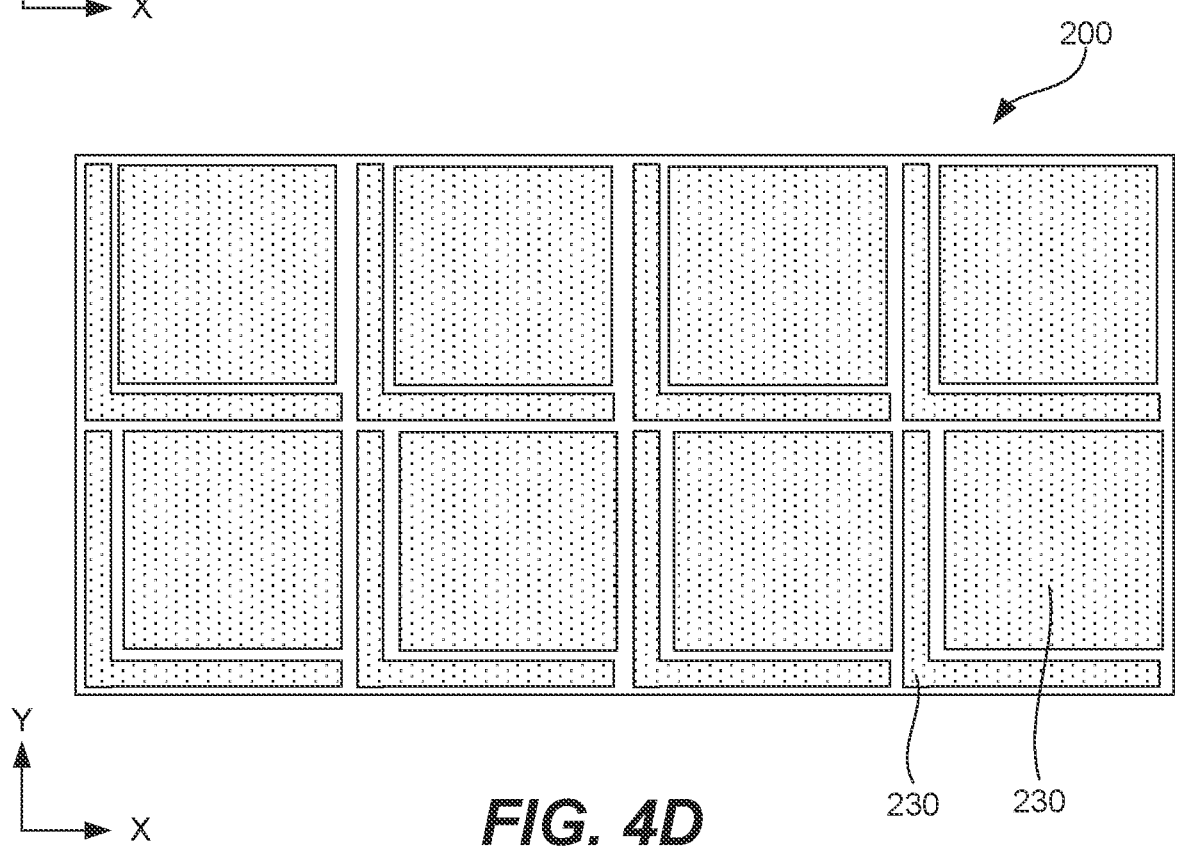

FIG. 4D is a schematic top view of flexible multi-battery assembly 200 showing different footprints of pluralities electrochemically active stacks 230. This example shows that the same flexible multi-battery assembly 200 may include multiple different types of cells, e.g., to maximize utilization of materials and processing time.

Examples of Manufacturing Flexible Multi-Battery Assemblies

Figure 5:
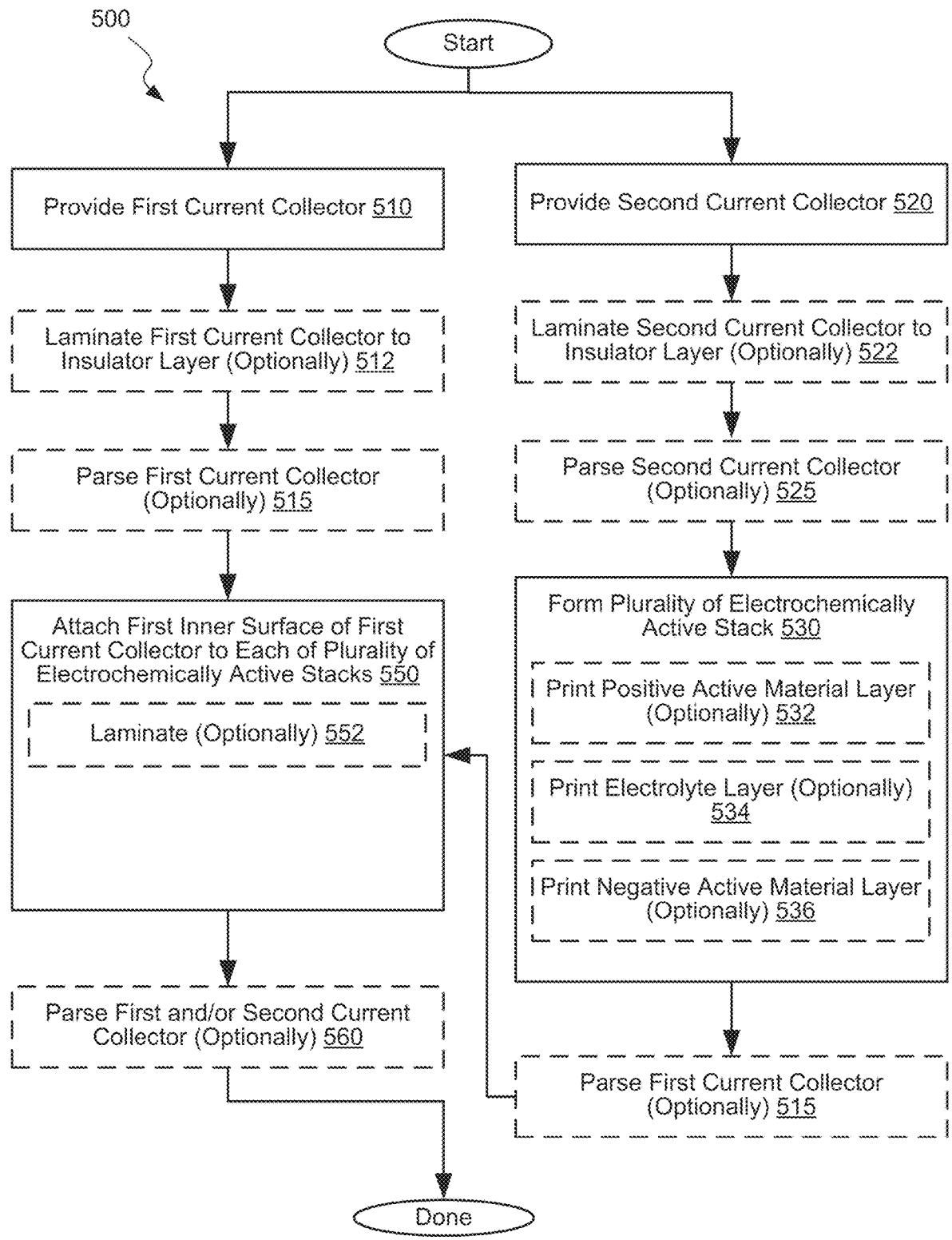
FIG. 5 is a processing flowchart corresponding to a method of manufacturing a flexible multi-battery assembly, in accordance with some examples.

FIG. 5 is a process flowchart corresponding to method 500 of manufacturing flexible multi-battery assembly 200, in accordance with some examples. Various examples of flexible multi-battery assembly 200 are described above.

In some examples, method 500 commenced with providing first current collector 210 (block 510) and providing second current collector 220 (block 520). First current collector 210 comprises first inner surface 211 and first outer surface 212. Second current collector 220 comprises second inner surface 221 and second outer surface 222. Additional features and examples of first current collector 210 and second current collector 220 are described above.

In some examples, method 500 comprises laminating (block 512) first current collector 210 to insulator layer 250. Alternatively, first current collector 220 is used in later operations as a standalone structure. Furthermore, in some examples, method 500 comprises parsing (block 515) first current collector 210 into first plurality of current collector portions 215. This parsing may be performed, e.g., after laminating first current collector 210 to insulator layer 250, e.g., such that insulator layer 250 provides support to separate current collector portions.

In some examples, method 500 comprises laminating (block 522) second current collector 220 to insulator layer 250. Alternatively, second current collector 220 is used in later operations as a standalone structure. Furthermore, in some examples, method 500 comprises parsing (block 525) second current collector 220 into second plurality of current collector portions 225. This parsing may be performed, e.g., after laminating second current collector 220 to insulator layer 250, e.g., such that insulator layer 250 provides support to separate current collector portions.

Method 500 proceeds with forming plurality of electrochemically active stacks 230 on second inner surface 221 of second current collector 220 (block 530). Each of plurality of electrochemically active stacks 230 comprises positive active material layer 140, electrolyte layer 150, and negative active material layer 160. Various examples and features of positive active material layer 140, electrolyte layer 150, and negative active material layer 160 are described above. In some examples, forming plurality of electrochemically active stacks 230 on second inner surface 221 comprises printing positive active material layer 140 (block 532), printing electrolyte layer 150 (block 534), and/or printing negative active material layer 160 (block 536).

More specifically, positive active material layer 140 and/or other layers described below are printed using one or more of the following techniques: direct write printing, screen printing (e.g. Atma, M&R, Colt, flexographic printing (Dai's Machinery, Line O Matic, gravure printing, dispenser printing, ink jet printing (e.g., FUJIFILM Dimatix, and slot die coating.

Direct write dispenser printing comprises a method for additively depositing a variety of materials, including slurries, solutions, and suspensions, generally referred to as "inks." Direct write dispenser printing is a flow-based method of direct write patterning with the ability to deposit inks at room temperature and ambient conditions, all the while generating negligible material waste and requiring minimal environmental overhead. In comparison to conventional micro-manufacturing techniques, which utilize subtractive processes such as lithography and etching, the number of process steps, energy demanded, and waste generated is significantly less.

In one arrangement, printable materials for electrodes are slurries of active electrode material particles mixed with a polymer binder(s, a removable solvent, and optional additives. In one example, cathode chemistries may comprise a metal oxide such as vanadium pentoxide particles, manganese dioxide particles, or both kinds of particles as the active cathode material particles. In one example, the anode chemistries have zinc particles as the active anode material particles.

After the ink deposition, the ink is dried. In some examples, the drying is performed at a room temperature for about 1-15 minutes and then at a temperature of 60°-90° C. for about 3-30 minutes. A vacuum oven, an infrared lamp, and/or a heat lamp may be used for drying. The drying process removes one or more solvents from the deposited ink thus leaving a solid layer, which is referred to as positive active material layer 140. After all layers are printed, the entire printed stack may be dried to remove any residual evaporative solvents.

Figure 1E:
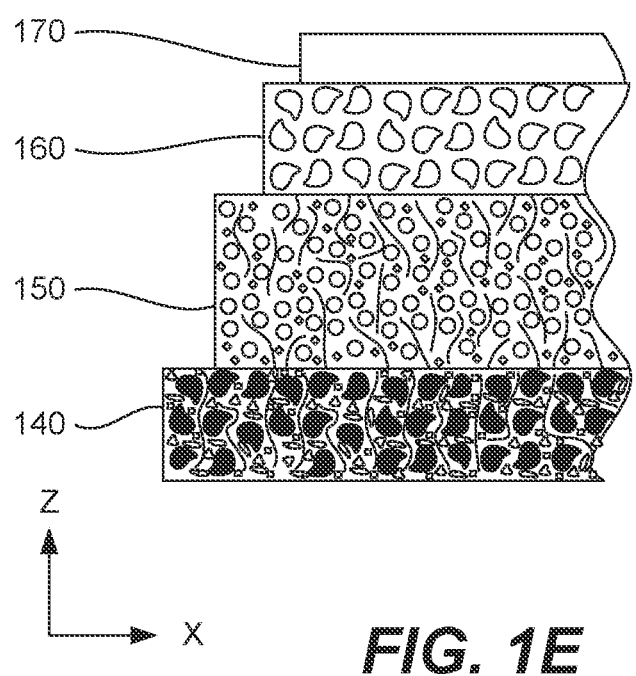

Different printing techniques used for printing positive active material layer 140, electrolyte layer 150, negative active material layer 160 may result in different alignment of these components. For example, FIG. 1D illustrates edges of positive active material layer 140, electrolyte layer 150, and negative active material layer 160 printed using screen printing. FIG. 1E illustrates edges of positive active material layer 140, electrolyte layer 150, and negative active material layer 160 printed using stencil printing. During stencil printing, the edge alignment may be similar to a pyramid due the stencil size used for printing electrolyte layer 150 being larger than the stencil for positive active material layer 140.

Method 500 proceeds with attaching first inner surface 211 of first current collector 210 to each plurality of electrochemically active stacks 230 (block 550). In some examples, the attaching operation (block 550) comprises laminating (block 552) first current collector 210 to each plurality of electrochemically active stacks 230, formed on second current collector 220. For example, conductive adhesive layer 170 may be used for this purpose (e.g., as shown in FIG. 1B). In some examples, positive interface layer 130 is used for this purpose (e.g., as shown in FIG. 1C).

Upon completing method 500 and manufacturing flexible multi-battery assembly 200, first current collector 210 is parsed into first plurality of current collector portions 215, not directly contacting each other, as, e.g., is shown in FIG. 2A. In the same or other examples, second current collector 220 is parsed into a second plurality of current collector portions 225, not directly contacting each other, as, e.g., is shown in FIG. 2B. Furthermore, in flexible multi-battery assembly 200 (upon completion of its manufacturing), at least one of first outer surface 212 and second outer surface 222 is fully exposed.

Parsing of first current collector 210 may be performed at various stages of method 500 as, for example, is shown in FIG. 5. For example, parsing first current collector 210 into first plurality of current collector portions 215 may be performed after attaching first inner surface 211 to each plurality of electrochemically active stacks 230 (block 560). More specifically, this parsing operation (block 560) may be performed within 5 minutes after attaching first inner surface 211 to each plurality of electrochemically active stacks 230 (block 550). When first inner surface 211 is each plurality of electrochemically active stacks 230, multiple electrochemical cells 100 of flexible multi-battery assembly 200 are formed while being connected in parallel. If one of these electrochemical cells 100 has a short or other defect, this defect may overtime impact performance of other cells. During the parsing operation (block 560), electrochemical cells 100 are electrically isolated from each other.

In some examples, the parsing comprises cutting through boundary insulator 240, positioned between two adjacent electrochemically active stacks 230. This cutting effectively forms two separate boundary insulators 240, one for each stack. As noted above, boundary insulators 240 provide support between the current collectors and isolate the internal components of the cells from the environment. When boundary insulators 240 forms an edge of the battery cell no additional separation between first current collector 210 and second current collector 220 is needed at this location (e.g., to prevent shorting between the two current collectors).

Alternatively, parsing first current collector 210 into first plurality of current collector portions 215 may be performed prior to attaching first inner surface 211 to each plurality of electrochemically active stacks 230 (block 515). The parsing operation may be performed using a laser to avoid burrs and shorting or one or more dies (provided the insulator is thick enough and will not be cut through) can be used to only cut (or kiss-cut).

After the parsing operation (block 515), first plurality of current collector portions 215 may be supported on a temporary substrate (e.g., releasable liner).

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered as illustrative and not restrictive.

What is claimed is:

1. A flexible multi-battery assembly comprising:
   a first current collector, comprising a first inner surface and a first outer surface and parsed into a first plurality of current collector portions, not directly contacting each other;
   a second current collector, comprising a second inner surface and a second outer surface, wherein:
      the first inner surface and the second inner surface face each other, and
      the first outer surface and the second outer surface face away from each other; and
      the second outer surface is exposed; and
   a plurality of electrochemically active stacks, disposed between and directly contacting the first inner surface and the second inner surface, wherein:
      portions of the second inner surface, extending between the plurality of electrochemically active stacks are exposed,
      each of the plurality of electrochemically active stacks directly contacts one of the first plurality of current collector portions,
      each of the plurality of electrochemically active stacks is flexible and comprises a positive active material layer, an electrolyte layer, and a negative active material layer, and
      the second current collector is a continuous structure providing support to the plurality of electrochemically active stacks relative to each other.

2. The flexible multi-battery assembly of claim 1, further comprising a boundary insulator disposed between and directly contacting the first inner surface and the second inner surface and surrounding each of the plurality of electrochemically active stacks.

3. The flexible multi-battery assembly of claim 2, wherein the boundary insulator comprises a plurality of disjoined structures, each surrounding one of the plurality of electrochemically active stacks.

4. The flexible multi-battery assembly of claim 2, wherein the boundary insulator continuously extends between each of adjacent pair of the plurality of electrochemically active stacks.

5. The flexible multi-battery assembly of claim 4, wherein the boundary insulator provides support to the plurality of electrochemically active stacks relative to each other, and wherein the second current collector is parsed into a second plurality of current collector portions, not directly contacting each other.

6. The flexible multi-battery assembly of claim 1, further comprising an insulator layer, adhered to the first outer surface.

7. The flexible multi-battery assembly of claim 6, wherein the insulator layer comprises insulator openings such that the portions of the second inner surface are exposed through the insulator openings.

8. The flexible multi-battery assembly of claim 1, wherein a thickness of the flexible multi-battery assembly is less than 400 micrometers.

9. The flexible multi-battery assembly of claim 1, wherein at least the electrolyte layer is printed.

10. The flexible multi-battery assembly of claim 1, wherein the electrolyte layer comprises an ionic liquid.

11. The flexible multi-battery assembly of claim 1, wherein the electrolyte layer has an ionic conductivity between 2.3 mS/cm and 2.7 mS/cm.

12. The flexible multi-battery assembly of claim 1, wherein the second current collector comprises a carbon-coated metal foil.

13. The flexible multi-battery assembly of claim 1, wherein each of the plurality of electrochemically active stacks is configured to reversibly bend to a bend radius of less than 40 millimeters.

14. The flexible multi-battery assembly of claim 1, wherein the positive active material layer comprises an ionic liquid liquid selected from the group consisting of 1-ethyl-3-methyl imidazolium bis(trifluoromethylsulfonyl) imide and 1-ethyl-3-propyl pyrrolidinium bis(trifluoromethylsulfonyl) imide.

15. The flexible multi-battery assembly of claim 1, wherein the positive active material layer comprises a material selected from the group consisting of zinc(II) bis (trifluoromethanesulfonyl) imide, zinc chloride, zinc fluoroborate, ammonium chloride, ammonium tetrafluoroborate, and potassium hydroxide.

16. The flexible multi-battery assembly of claim 1, wherein the electrolyte layer comprises an electrolyte binder, an electrolyte ionic liquid, and an electrolyte salt.

17. The flexible multi-battery assembly of claim 16, wherein the electrolyte binder is selected from the group consisting of poly(vinylidene fluoride) (PVDF), poly(vinylidene fluoride-hexaflouropropylene) (PVDF-HFP), polyvinyl alcohol (PVA), poly(ethylene oxide) (PEO), poly(acrylo-nitrile) (PAN), and poly(methyl methacrylate) (PMMA), an epoxy derivative, and a silicone derivative.

18. The flexible multi-battery assembly of claim 16, wherein the electrolyte ionic liquid is 1-butyl-3-methylimidazolium trifluoromethanesulfonate.

19. The flexible multi-battery assembly of claim 16, wherein the electrolyte salt is trifluoromethanesulfonate.

20. The flexible multi-battery assembly of claim 1, wherein the negative active material layer comprises at least 95% by weight of elemental zinc.

\* \* \* \* \*